United States Patent

Stewart et al.

[15] 3,693,432
[45] Sept. 26, 1972

[54] ARTILLERY GUN SHOCK SIMULATOR

[72] Inventors: Walter N. Stewart, Willingboro; William J. Tatu, Palymra, both of N.J.

[73] Assignee: The United States of America, as represented by the Secretary of the Army

[22] Filed: June 22, 1971

[21] Appl. No.: 156,411

[52] U.S. Cl. .................................. 73/167, 73/12
[51] Int. Cl. .................................. G01m 19/00
[58] Field of Search ............... 73/167, 12, 5; 221/278

[56] References Cited

UNITED STATES PATENTS 3,597,969  8/1971  Curchak .................. 73/167
3,175,240  3/1965  Hillard .................... 221/278

*Primary Examiner*—Louis R. Prince
*Assistant Examiner*—Denis E. Corr
*Attorney*—Harry M. Saragovitz

[57] ABSTRACT

A weapon shock simulator testing arrangement having a gun tube with a breech mechanism to close its rearward end and extension tubes connected to its forward muzzle end terminating with a sealing cap. A metering sleeve, having a plurally apertured cylindrical sidewall between its outwardly directed end flanges, is positioned in an internally enlarged annulus of the gun tube that defines a breech chamber. A piston or projectile containing a mechanical time fuze test sample is slidably mounted in the metering sleeve and adopted to operatively spin through the gun tube rifling grooves when moved forwardly by low and high fluid pressures from controlled sources. A regulated intermediate fluid pressure is delivered to the forwardmost extension tube adjacent the sealing cap to cushion and retard or stop the fired specimen carrier prior to its extraction for inspection or observation purposes.

5 Claims, 1 Drawing Figure

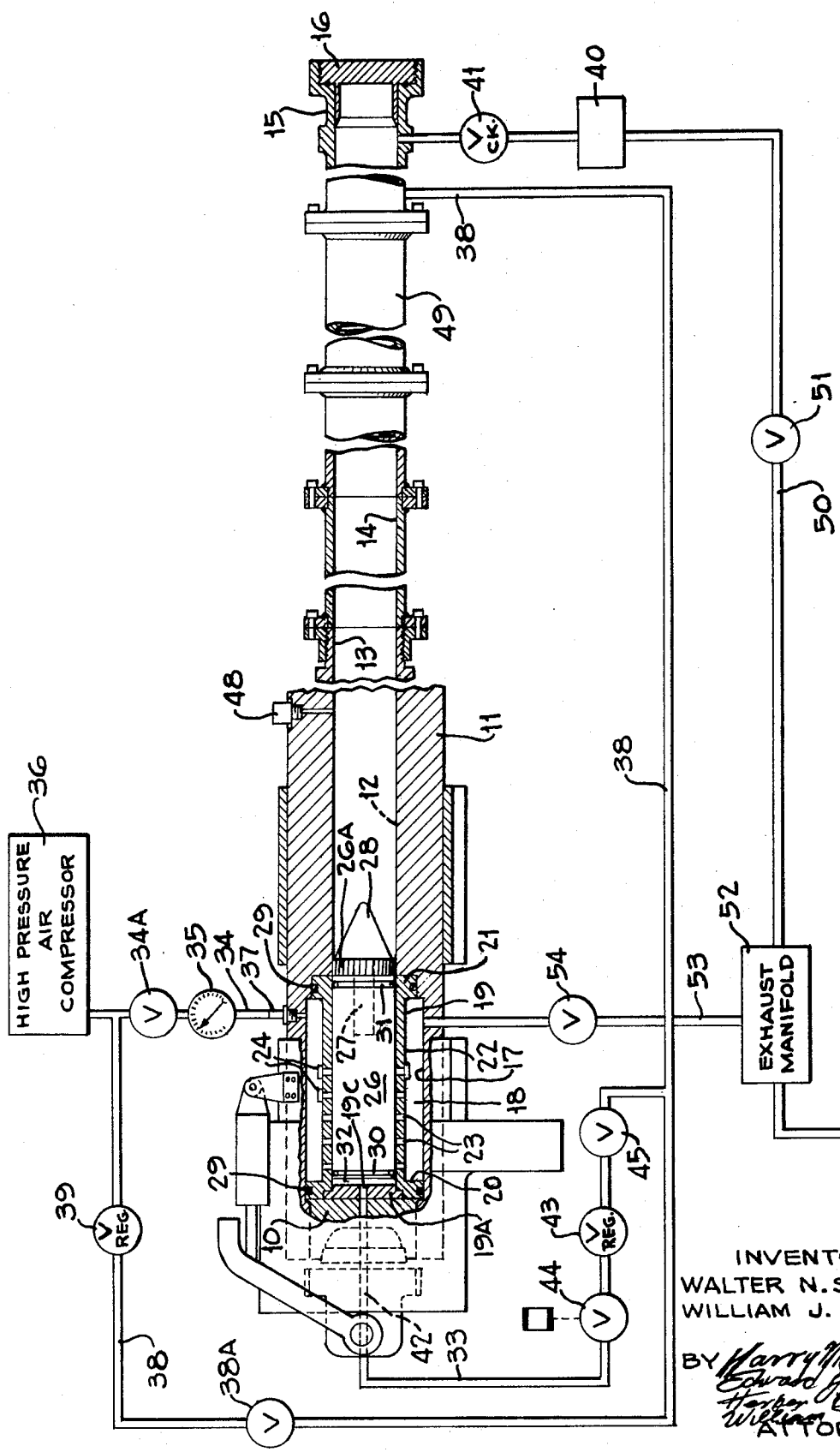

ARTILLERY GUN SHOCK SIMULATOR

The invention described herein may be manufactured, used and licensed by or for the Government for governmental purposes without the payment to us of any royalty thereon.

This invention relates to testing apparatus, and more particularly to a weapon shock simulator testing arrangement for mechanical time fuzes and the like requiring simulataneous spin and set-back focus to assimilate firing conditions.

Prior laboratory test facilities do not simulate actual gun fire environment that has simultaneous set-back and spin forces acting upon fuzes, timers and associated components being tested. In such arrangements, such as where only set-back forces are generated without spin, the test results are not fully realistic, but rather inaccurate or misleading.

It is an object of the invention to provide a weapon shock simulator testing arrangement in which a test sample can be subjected to simultaneous set-back and spin forces without suffering terminal impact damage.

Another object of the invention is to provide such a testing arrangement in which the test sample can be recovered intact and then be examined and evaluated by engineering personnel for effects of spin and set-back forces.

A further object of the invention is to provide such a testing arrangement in which the spin and set-back forces applied to a test sample can be controlled and simulate a ballistic shock curve.

These and other objects, features and advantages will become more apparent from the following description and accompanying drawing which is substantially an elevational view partially broken away in section, with certain portions shown schematically, of a preferred arrangement embodying the principles of the invention.

In the preferred arrangement an appropriate swingable and securable breech mechanism 10 is positioned for normally closing the rearward end of gun tube 11, the forward portion of which has internal rifling grooves 12, that matingly receive the bands of the pre-engraved, molded nylon rotating band 26A on piston 26. The muzzle end 13 of the gun tube has suitable connected thereto the first or rearwardmost one of a predetermined number of longitudinally aligned extension tubes 14 each of which is in alignment with the gun barrel interior. The forwardmost extension tube 15 terminates in an enlarged internally threaded hub or annulus for securing an appropriate sealing cap member 16.

The rearward portion of the gun barrel has an internal enlarged annulus 17 defining a breech chamber 18 in which is positioned a metering sleeve 19 having outwardly directed end flanges 20, 21 with a plurally apertured cylindrical sidewall 22 extending therebetween. The sleeve sidewall apertures metering orifices 23, for delivering controlled pressure fluid as will be described hereinafter, predetermined are of a rather large quantity such that great flexibility of control is available when selected ones are filled with individual plugs 24. The interior surface of the metering sleeve 19 is longitudinally aligned with the interior surface of the gun tube 11 and has piston 26 slidable mounted therein. The piston or projectile 26 has an appropriate forwardly opening control cavity for containing a mechanical time fuze test sample 27 rearwardly adjacent the nose portion 28 of the projectile.

Alternatively, the test sample could be mounted in the rearward end of the piston. The end flanges 20, 21 have suitable O-ring seals 29 that cooperate with the piston O-ring seals 30, 31 to preclude undesired pressure fluid leakage rearwardly of the metering sleeve 19 or forwardly of the piston 26. The rear end closure portion 19A of the metering sleeve 19 has a central passage 19C that is longitudinally aligned with an appropriate passage 42 through the breech mechanism 10 by which the rearmost gun chamber area 32 behind the piston is placed in fluid communication with the pulse line 33 of a solenoid operated low pressure fluid source.

A high pressure fluid inlet conduit 34, containing a manual or electric control valve 34A and a manually monitored high pressure indicator fluid gauge 35, interconnects a high pressure (15,000 psi. capacity) air compressor 36 with the breech chamber 18 via an appropriate passage and high pressure fitting 37 positioned in gun tube sidewall rearwardly adjacent the sleeve flange 21. Alternatively a 22,000 psi. capacity helium compressor could be used. A regulated intermediate pressure fluid conduit 38 is fluidly connected with a forward portion of extension tube 15 and contains an intermediate pressure (400–2,000 psi.) regulator valve 39 adjacent its connection with high pressure conduit 34 and a shut off valve 38A. An expansion tank 40 (2,000 psi. capacity) is fluidly connected with the interior of extension tube 15 rearwardly adjacent the cap 16, the fluid connection with tube 15 containing a suitable one-way check valve 41 so that exhaust line 50 and valve 51 can bleed tank pressure fluid to exhaust manifold 52 for discharge to the atmosphere. Exhaust conduit 53 containing valve 54 interconnects the breech chamber 18 with manifold 52.

Pulse line or low pressure conduit 33 fluidly interconnects conduit 38 with an inlet passage 42 extending through the breech mechanism and contains a 500 psi. regulator valve 43, a solenoid controlled valve 44, and an appropriate shut-off valve 45. Substantially mid-length of the gun barrel 11, a transducer fitting 48 is mounted in a suitable transverse passage for instrumentation purposes.

After the piston 26 carrying the test sample has been chambered, the interior of the gun tube 11 is filled with pressure fluid (2,000 psi. maximum) from the conduit 38, the filling pressure fluid being approximately 2 ½ percent of the high pressure required for testing. This provides a back or cushion pressure for the piston nose when it is fired and traverses the gun tube before its flight through approximately two-thirds the total length of the extension tubes 14 to a point adjacent the indicated reference character 49. With the predetermined high pressure (15,000 psi.) fluid having been delivered to the gun chamber 18 surrounding the lateral surface of the metering sleeve 19 and initially sealed piston 26 contained therein, the solenoid operated valve admits a low pressure (500 psi.) fluid from pulse line 33 into the rearmost gun chamber area 32 behind the piston and its rearmost seal 30 within the metering sleeve, by which forward motion is imparted to the piston which then uncovers predetermined sleeve openings 23 to admit high pressure fluid behind the piston that is subjected to a shock pulse. This causes the piston or projectile to receive simultaneous set-back and spin forces similar to actual ballistic firings. As the piston is accelerated along the rifling grooves 12, its rotational speed is proportional to the pressures applied to its weight. The zero or reverse pressure velocity of the piston, which retards and cushions the terminal motion of the piston, is achieved by compression of the pressure fluid previously delivered into the gun tube arrangement forwardly of the piston.

Excess pressures are metered or bled off by utilization of expansion tank 40 through the one-way check valve 41. This prevents undesired violent reciprocating oscillations of the piston which would be caused if the pressures were controlled. After the system fluid pressure has been exhausted from the arrangement by the exhaust manifold 52, removal of cap 16 from the forwardmost extension tube 15 permits extraction of the piston and recovery of the test specimen for examination.

Various modifications, changes or alternations may be resorted to without departing from the scope of the invention as set forth in the appended claims.

We claim:

1. In a weapon shock simulator testing arrangement having a gun tube, a breech mechanism for closing a rearward end of said gun tube, extension tube means connected to a muzzle end of said gun tube, and a cap sealingly secured to a forward end of said extension tube means, said gun tube having an internal enlarged annulus defining a breech chamber, said gun tube having internal rifling grooves forwardly of said breech chamber, a controlled high pressure fluid source in fluid communication with said breech chamber for delivering high pressure fluid thereto, a metering sleeve in said breech chamber and having a plurally apertured cylindrical sidewall extending between outwardly directed sleeve end flanges, the sleeve sidewall having an interior surface longitudinally aligned with the gun tube interior surface, a piston slidably mounted in said metering sleeve and having means for containing a mechanical time fuze test sample therein, a solenoid operated low pressure fluid source in fluid communication with the interior of said metering sleeve behind said piston, and a regulated intermediate pressure fluid source in fluid communication with said extension tube means interior rearwardly adjacent said cap.

2. The structure of claim 1 wherein plug means fill selected ones of the sidewall apertures in the metering sleeve.

3. The structure of claim 2 wherein said controlled high pressure fluid source includes a 15,000 psi. capacity air compressor interconnected by first conduit means with a gun tube inlet adjacent said breech chamber, a high pressure fluid indicator gauge in said first conduit means, said regulated intermediate pressure fluid source includes a second conduit means connected to said extension tube means adjacent said cap, said second conduit means containing a 2,000 psi. regulator valve adjacent its connection with said first conduit means, and said solenoid operated low pressure fluid source includes a third conduit means interconnecting said second conduit means with an inlet passage extending through said breech mechanism, said third conduit means containing a 500 psi. regulator valve and a solenoid controlled valve.

4. The structure of claim 3 wherein a transducer fitting is located in a mid-length portion of said gun tube and is in fluid communication with the interior of said gun tube.

5. The structure of claim 3 wherein an expansion tank interconnects an exhaust manifold with said extension tube means adjacent said cap.

* * * * *